United States Patent [19]

Huf et al.

[11] 4,237,741
[45] Dec. 9, 1980

[54] MECHANICAL TRANSMISSION ARRANGEMENT

[76] Inventors: Franz-Joseph Huf; Roland Huf, both of Ailemannenstrasse 17, 7750 Konstanz, Fed. Rep. of Germany; Helga Huf, deceased, late of Konstanz, Fed. Rep. of Germany, by Franz-Joseph Huf and Roland Huf, legal representatives

[21] Appl. No.: 902,536

[22] Filed: May 3, 1978

[30] Foreign Application Priority Data

May 5, 1977 [DE] Fed. Rep. of Germany ....... 2720284

[51] Int. Cl.² .................. G05G 1/00; F16H 21/22; F16H 21/36
[52] U.S. Cl. ........................ 74/52; 74/49; 74/570; 74/604
[58] Field of Search ............ 74/44, 49, 50, 116, 74/570, 603, 604, 52; 123/192 R, 192 B

[56] References Cited

U.S. PATENT DOCUMENTS

| Re. 21,583 | 10/1940 | Bancroft ............................ 74/50 |
|---|---|---|
| 1,183,774 | 5/1916 | Schmitz ............................ 74/570 |
| 1,867,981 | 7/1932 | Mudd ............................ 74/570 X |
| 2,271,766 | 2/1942 | Huebotter ............................ 74/604 |
| 2,775,128 | 12/1956 | Young ............................ 74/49 |
| 3,258,992 | 7/1966 | Hittell ............................ 74/603 |
| 3,528,319 | 9/1970 | Ishida ............................ 74/603 |
| 3,563,222 | 2/1971 | Ishida ............................ 74/603 X |
| 3,626,786 | 12/1971 | Kinoshita et al. ............................ 74/604 |

*Primary Examiner*—Lawrence J. Staab
*Attorney, Agent, or Firm*—Sughrue, Rothwell, Mion, Zinn and Macpeak

[57] ABSTRACT

A modified hypocycloid gear arrangement is incorporated as a transmission converting rotary motion into linear motion or vice versa in any form of prime mover, such as a gas engine, internal combustion engine, or any form of pump or other energy converter, in place of a conventional crank-connecting rod transmission element; specific embodiments are disclosed, relating to single, twin, flat-four, vee-8 and other single and multicylinder piston engines and motors and their adaptions, e.g. to vibration-free surgical power saws and torpedo propulsion units, due to the improved mechanical efficiency and precise engine balancing allowed by transmission arrangemenets according to the invention disclosed.

19 Claims, 22 Drawing Figures

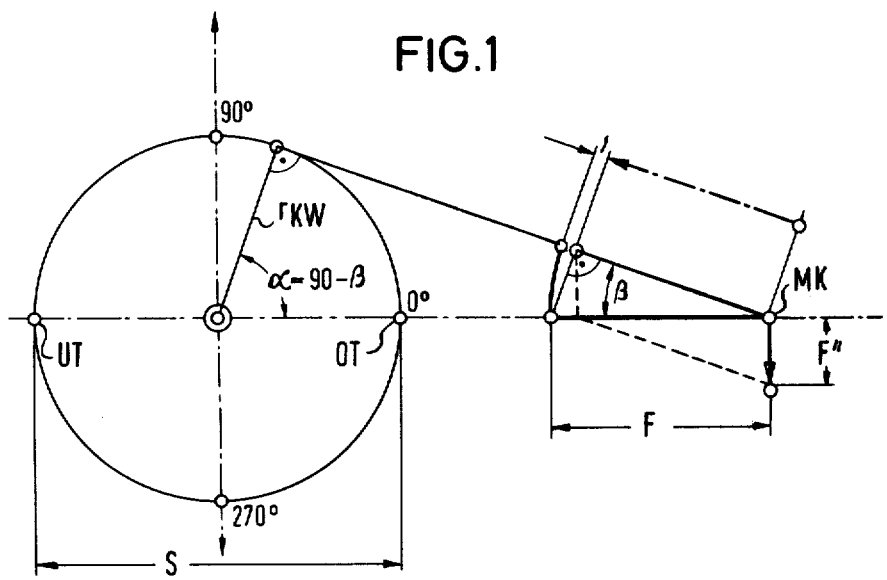
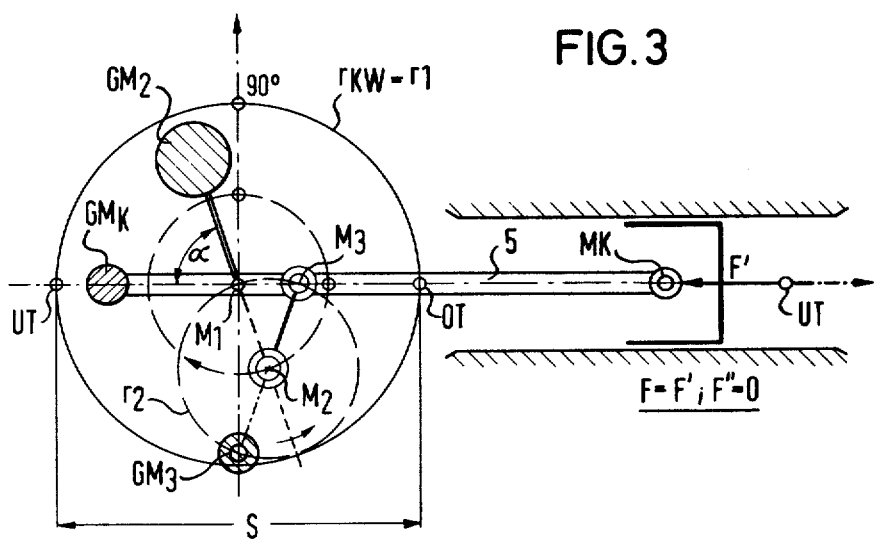

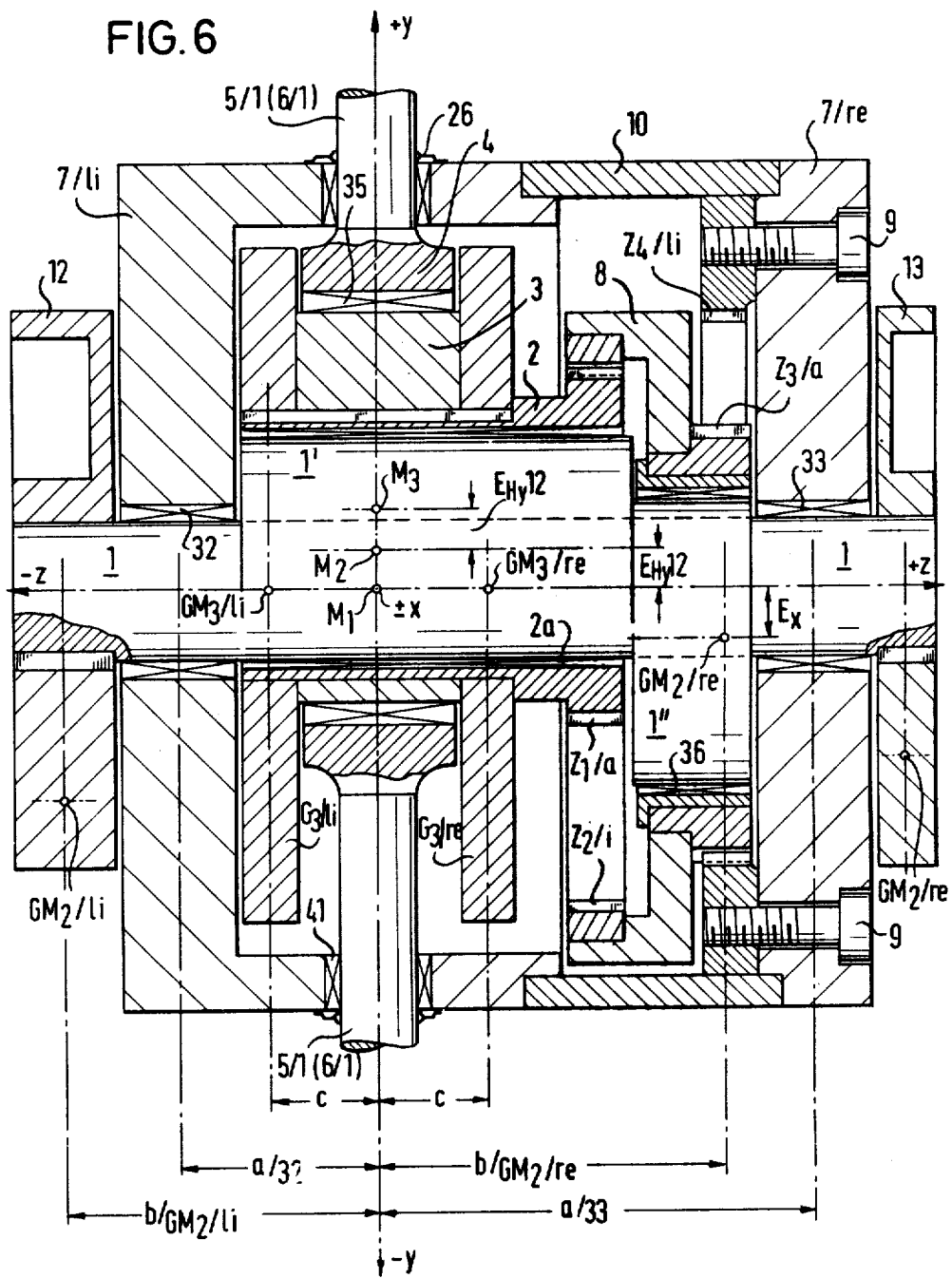

MECHANICAL TRANSMISSION ARRANGEMENT

The invention relates to a class of crank-type transmission arrangements or systems and is particularly concerned with an actually constructable class or series of such transmission arrangements, which are loadable as desired in accordance with the strength of the constructional materials used, such transmission arrangements being associated with a hypocycloid gear, which can be constructed with any desired number and arrangements of cylinders, are statically and dynamically fully balanceable and can be driven at any desired number of revolutions.

Crank mechanisms, consisting of one or more reciprocally-movable pistons and one or more cranks movable about a centre of rotation, wherein the piston and the crank are connected by means of a connecting rod, always have a reduced mechanical efficiency imposed by the transmission of force. They are only operable at restricted ranges of numbers of revolutions and are not statically and dynamically balanceable. The pistons are loaded with a lateral force. The largest moment of rotation does not occur at an angle of 90° from the top dead centre point of the crank, but at an angle of $\alpha = 90° - \beta$.

Hypocycloid gears are not subject to these disadvantages of crank mechanisms.

Known hypocycloid gears all operate however according to the principle of pure hypocycloids, wherein an externally-toothed gear wheel rolls on or meshes with the gear rim of an inwardly-toothed gear wheel, where the diameter of the inwardly-toothed gear wheel is in the ratio 2:1 to the externally-toothed gear wheel. Disadvantages of these known gear mechanisms consist particularly in that the gear wheels involved are overloaded and that any desired cylinder arrangement is not possible. Furthermore, known gears exhibit no satisfactory forced lubrication.

It is therefore an object of the invention to provide a class or series of crank-type prime movers and other transmission arrangements, association with hypocycloid gear mechanisms, which type of transmission arrangement does not suffer from the disadvantages in accordance with the state of the art, can be statically and dynamically fully balanced, includes no overloaded gear wheels, can drive any desired number and arrangement of cylinders in a propulsion or power machine, e.g. in a combustion engine or in a pump, has a satisfactorily-operating lubrication system and operates reliably in all practical cases of loading.

This object is solved in accordance with the invention by the combination of features that one or more primary eccentrics 1' are force-lockingly arranged on a main shaft, with their axes of rotation and mass running at a distance $E_{Hy}/2$ parallel to the z axis of the main shaft, that a supporting tube is mounted by means of a bearing on the primary eccentric and force-lockingly carries one or more secondary eccentrics, whose axis or axes of rotation and mass run parallel to the z axis of the main shaft at a maximum spacing $2 \times E_{Hy}/2$ through the resulting mass centre $M_3$ and a ring bearing with its axis of rotation through the mass centre $M_3$ is rotationally arranged on the secondary eccentric, the ring bearing force-lockingly carrying the connecting rod or rods 5/1 with actuating members 6/1 or including corresponding counter-weights $GM_3$, whose resultant overall centre of mass lies in the resulting mass centre $M_3$ and this mass centre $M_3$ is force-lockingly associated with counter-masses connected with the supporting tube and arranged to the left and to the right of the main balance plane x-y, e.g. $G_{3li}$ and $G_{3re}$, so that a secondary resultant mass centre $M_2$ is produced, which rotates with the main shaft on a circle with a radius $E_{Hy}/2$ about the mass centre $M_1$, which is force-lockingly compensated by balance masses $GM_{2li}$ and $GM_{2re}$ connected with the main shaft, so that a resultant overall centre of mass $M_1$ is given on the z axis of the main shaft, and that by means of an actually-loadable compensating gear a kinetic simulation of a hypocycloid is given so that the centre of mass $M_3$ moves exactly on the y axis, whereas the centres of mass $GM_{2li}$ and $GM_{2re}$ move on the x axis.

In further advantageous developments of the invention, it is provided that the compensating gear includes an internally-toothed gear wheel arranged on the supporting tube, which meshes with an externally-toothed gear wheel, where the gear wheel is fixedly arranged on a supporting tube and such supporting tube is mounted by means of a bearing on the main shaft and by means of a bearing located in an intermediate wall of the housing so that a second externally-toothed gear wheel is arranged on the supporting tube and meshes with externally-toothed gear wheels mounted by means of shafts in intermediate walls of the housing, which in turn mesh with an internally-toothed gear wheel arranged on the main shaft, whereby the centres of rotation of the externally-toothed gear wheels are arranged radially spaced from the main shaft and the centre of rotation of the internally-toothed gear wheel lies on the axis of the main shaft.

Another advantageous feature provides that the supporting tube carries an externally-toothed gear wheel which meshes with an inwardly-toothed gear wheel which is arranged in a ring gear mounted on a second eccentric, that the ring gear includes a further externally-toothed gear wheel which meshes with a further fixedly-arranged internally-toothed gear wheel, whereby the axis of rotation of the ring gear is located at a spacing $E_x$ parallel to the axis of the main shaft.

A further preferred feature is also advantageous, in that the supporting tube carries an externally-toothed gear wheel, which meshes with an internally-toothed gear wheel, whereby externally-toothed gear wheels mounted in the housing wall mesh with the internally-toothed gear wheel likewise radially spaced from the axis of the main shaft, which gear wheels in turn mesh with an externally-toothed gear wheel likewise arranged on the main shaft.

By the invention, it is therefore achieved that the supporting tube rotates with the same angular velocity exactly opposite to the primary eccentric and thus simulates the rolling circle of pure hypocycloid kinetics, which therefore ensures that all gear wheels have so large a pitch cycle that a real tooth flank loading is always attainable. A further advantage consists in the improved theoretically-attainable mechanical efficiency $\eta_{mechanical}$, since the mass centre $M_3$ moves on the y axis, is quantitatively a part of the supporting tube and thus represents a balance weight in the x-y plane.

Further advantageous features of the crank-type transmission systems or arrangements in accordance with the invention are given below and also in the subclaims, in conjunction with the accompanying drawings and description; in the drawings:

FIG. 1 shows a diagrammatic representation of the kinetics of a conventional crank transmission system with a connecting rod and crank;

FIG. 3 shows a diagrammatic representation of the arrangement of the balance masses of a hypocycloid gear;

FIG. 6 shows a side view of another embodiment of the transmission system in accordance with the invention;

Figure 2:
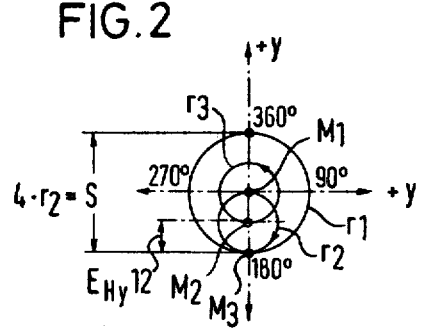
FIG. 2 shows a diagrammatic representation of a hypocycloid gear.

FIG. 1 shows a diagramtic representation of the kinetics and the forces of a conventional driving crank system with a connecting rod and crank, with the disadvantages which are already described. These disadvantages are avoided by a driving crank arrangement with a hypocycloid gear with a kinetic arrangement according to FIG. 2. It can be seen that the rolling circle with the radius $r_2$ rolls in the pitch circle with the radius $r_1$; wherein the ratio of $r_1$ to $r_2 = 2:1$ and the mass centre $M_3$ moves exactly on the y-axis along the section $2 \times r_1$, whereas a counter-mass centre $GM_3$ arranged opposite the mass-centre $M_3$ moves exactly along the x-axis along the section $2 \times r_1$ (see FIG. 3). The resultant mass of $M_3 + GM_3 = M_2$, by rolling of the circle of radius $r_2$ in the circle of radius $r_1$, moves through 360° round the circle of radius $r_3$. This mass $M_2$ can be opposed in turn by a counter-mass $GM_2$, so that a resulting mass centre is given at the point of intersection of the x-y axes. It can be seen in FIG. 3 that $M_3$ can also be a mass centre, namely that of the piston MK, the connecting rod 5 and the total counter-mass GMK. $M_3$ moves exactly on the y axis from the top dead centre point OT to the bottom dead centre point UT. The total mass equation in the x-y plane perpendicular to the z axis at the point of intersection of the x-y axes runs:

$$M_3 = MK + GMK$$

$$M_2 = M_3 + GM_3 \text{ (left + right)}$$

$$M_1 = M_2 + GM_2 \text{ (left + right)}$$

Figure 4:
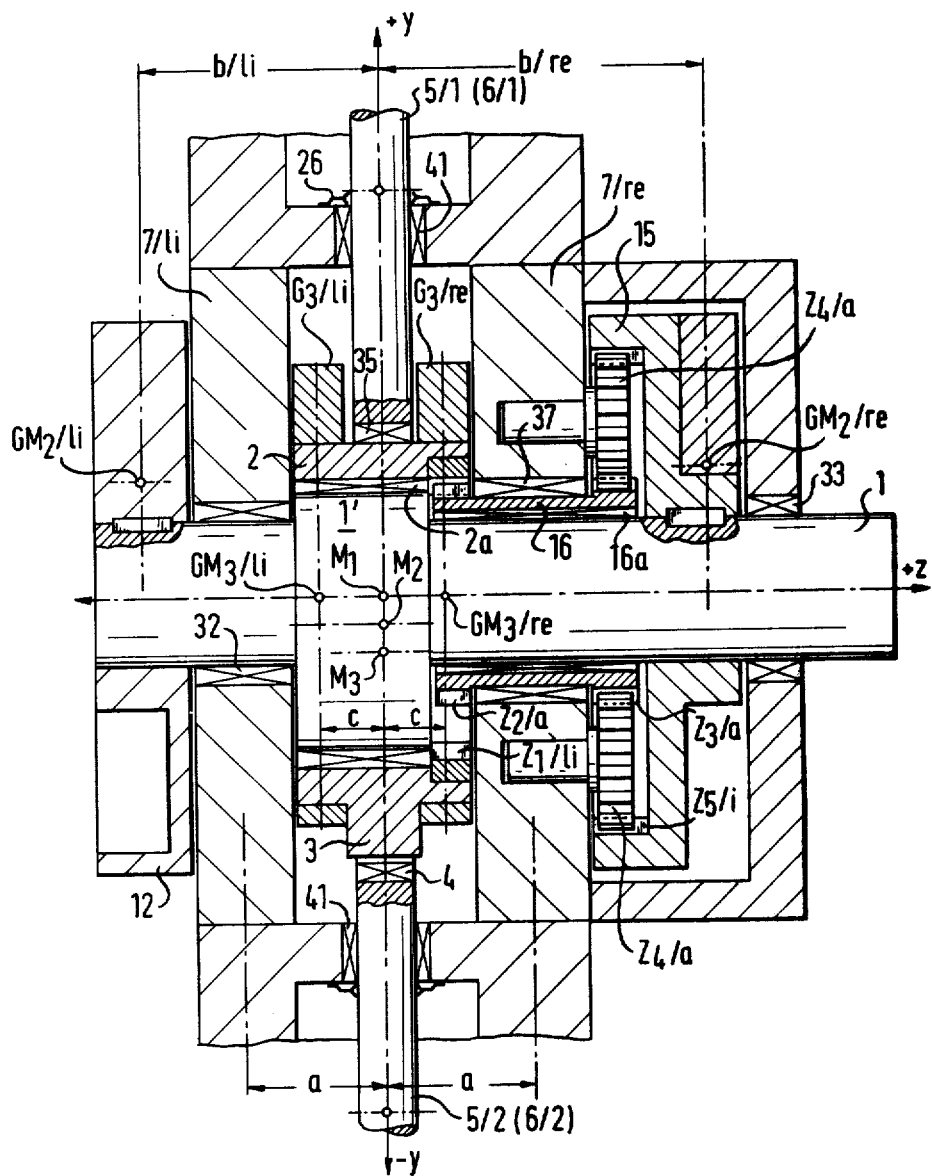
FIG. 4 shows a side view of a transmission arrangement in accordance with the invention.

The mass equation represented theoretically in FIG. 3 is effective for a real construction according to FIG. 4.

In FIG. 4, on a through-going main shaft 1 which can be constructed to any desired dimensions and has a rotation axis z in the x-y plane, a primary eccentric 1' is arranged, with an eccentricity spacing $E_{Hy}/2$ equal to $M_1 - M_2$ from the z axis. A supporting tube 2 exactly opposing the main shaft 1 is rotatably mounted on the eccentric 1' by means of a bearing 2a. A secondary eccentric 3 and an internal gear wheel $Z_1/i$ are rigidly connected with the supporting tube 2. The distance of the mass centre $M_3$, the rotational centre of the bearing 35, from the mass centre $M_2$ amounts to $E_{Hy}/2$, that is $M_3 - M_2 = M_1 - M_2$.

The gear wheel $Z_1/i$ arranged on the secondary eccentric 3 meshes with a gear wheel $Z_2/a$ arranged on the supporting tube 16. A second gear wheel $Z_3/a$ arranged on the supporting tube 16 meshes with the gear wheel $Z_4/a$, which in turn meshes with an internally-toothed gear wheel $Z_5/a$ of a ring gear 15. The ring gear 15 is fixedly mounted on the main shaft 1. By this arrangement, the gear wheels $Z_1/i$ to $Z_5/i$ are able to reproduce the kinetics of a hypocycloid.

Figure 5:
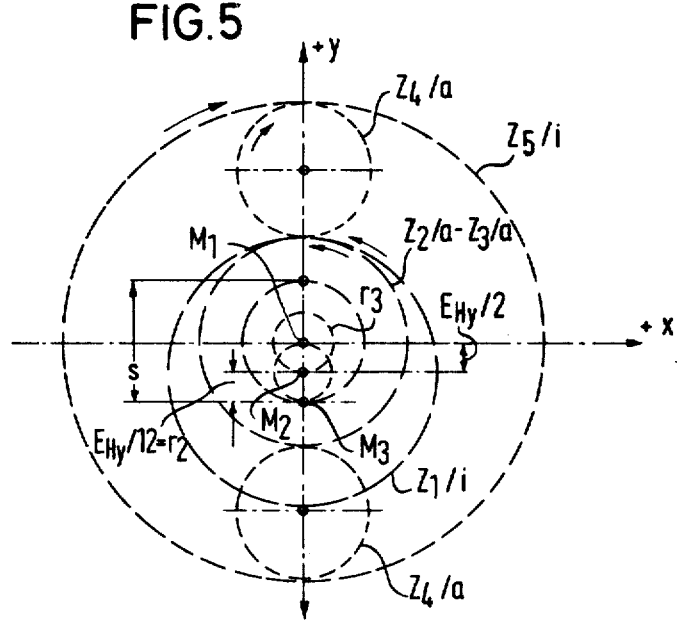
FIG. 5 shows a diagrammatic representation of the kinetics of the transmission arrangement according to FIG. 4.

FIG. 5 shows a diagrammatic cross-section of the transmission arrangement represented in FIG. 4, with the pitch circles of the gear wheels $Z_1/i$, $Z_2/a = Z_3/a$, $Z_4/a$ and $Z_5/i$ and the mass centres $M_3$, $M_2$ and $M_1$, as well as the stroke s on the y axis. The direction of rotation of the respective gear wheels is shown by the arrows.

The supporting tube rotates exactly opposite the primary eccentric 1' and is thus kinetically equivalent to the rolling circle with radius $r_2$ of a hypocycloid gear. A true hypocycloid gear with the corresponding kinetics requires very small gear wheels, with unreal gear tooth flank loadings; by the kinetics obtainable in accordance with the invention, such large pitch circles for all gear wheels are effectively possible that always a realistic gear tooth flank loading is ensured. A particular advantage of the kinetics according to FIGS. 1 and 2 lies in the better theoretical mechanical efficiency $\eta_{mechanical}$ obtainable. In the so-called equivalent kinetics, this advantage is fully realised. Since the mass centre $M_3 = (MK + GMK) = (5/1 + 6/1 + 5/2 + 6/2)$ (with conventional gear wheel tolerances and back-lash) moves on the y axis, it is equivalent to a part of the supporting tube 2 and thus represents a balance weight in the x-y plane.

Counter-masses $G_{3/li}$ and $G_{3/re}$ located at a distance c must oppose the mass centre $M_3$ to the left and to the right of the x-y plane, whereby a resultant mass centre $M_2$ is produced in the axis of rotation of the primary eccentric $1'$.

The mass centre $M_2$ thus moves on the circle with the radius $r_3$ according to FIG. 3 and is therefore likewise so ideally balanced by counter-masses $GM_{2/li}$ and $GM_{2/re}$, which are fixedly mounted on the main shaft 1, that a resultant total mass centre $M_1$ is produced in the centre of the system. The gear mechanism illustrated in FIGS. 1 and 2 includes a three-part bearing for the main shaft 1 in the left main bearing 32, the central double bearing 37 and 16a and the right main bearing 33.

The central double bearing is a constructive necessity and illustrates the kinetic bridge 16 forming the support for the two gear wheels $Z_2/a$ and $Z_3/a$, which can thus be of equal size.

The exactly sinusoidally moving connection rod 5/1 (upper) and its corresponding counterpart 5/2 (lower) carry actuating members 6/1 (upper) and 6/2 (lower). These can be normal pistons including conventional piston rods or only one piston and a free counter-weight (5/2+6/2), which can then operate free from jamming without the guide bearing 41 (upper) and 41 (lower). The gear case is sealed by means of an oil seal 26.

In FIG. 6, a follower or guidance system with two main shaft bearings 32 and 33 is illustrated. In addition to the usual primary eccentric $1'$, the main shaft 1 carries a further auxiliary eccentric $1''$, which is rotationally displaced with respect to $1'$ by 180° and carries a ring gear 8 rotationally mounted by means of the bearing 36.

The follower or guidance effect required for a hypocycloid gear is provided by means of an externally-toothed gear wheel $Z_1/a$ with a large pitch circle diameter which is arranged on the supporting tube 2, which engages in an internal gearing $Z_2/i$ of the gear ring 8, that is it is compensated by the latter. The gear ring 8 is so driven by its externally-toothed gear ring $Z_3/a$ rolling in a fixed internal gearing $Z_4/i$, that the required exact simulation of the kinetics of a hypocycloid gear is effectively ensured.

A particular advantage of this construction is the exact adjustability of the whole gear mechanism by precise rotation of the internal gear ring $Z_4/i$ about the z axis and adjustment from outside by means of the screw 9, so that the mass centre $M_3$ moves exactly along the y axis.

In this way, a closed hypocycloid crank case can be constructed, in which the connecting rods 5/1 and 5/2 are guided in the guide bearings 41 and the crank case itself is closed so as to be oil and gas tight by means of the seal 26.

In view of the balancing, in the system according to FIG. 6, the same relationships hold as in the system according to FIGS. 4 and 5, but with the advantage that the whole counter-mass $GM_{2/re}$ can be located in the gear ring 8, so that a counter-mass need no longer be arranged in the right-hand flywheel 13.

Figure 8:
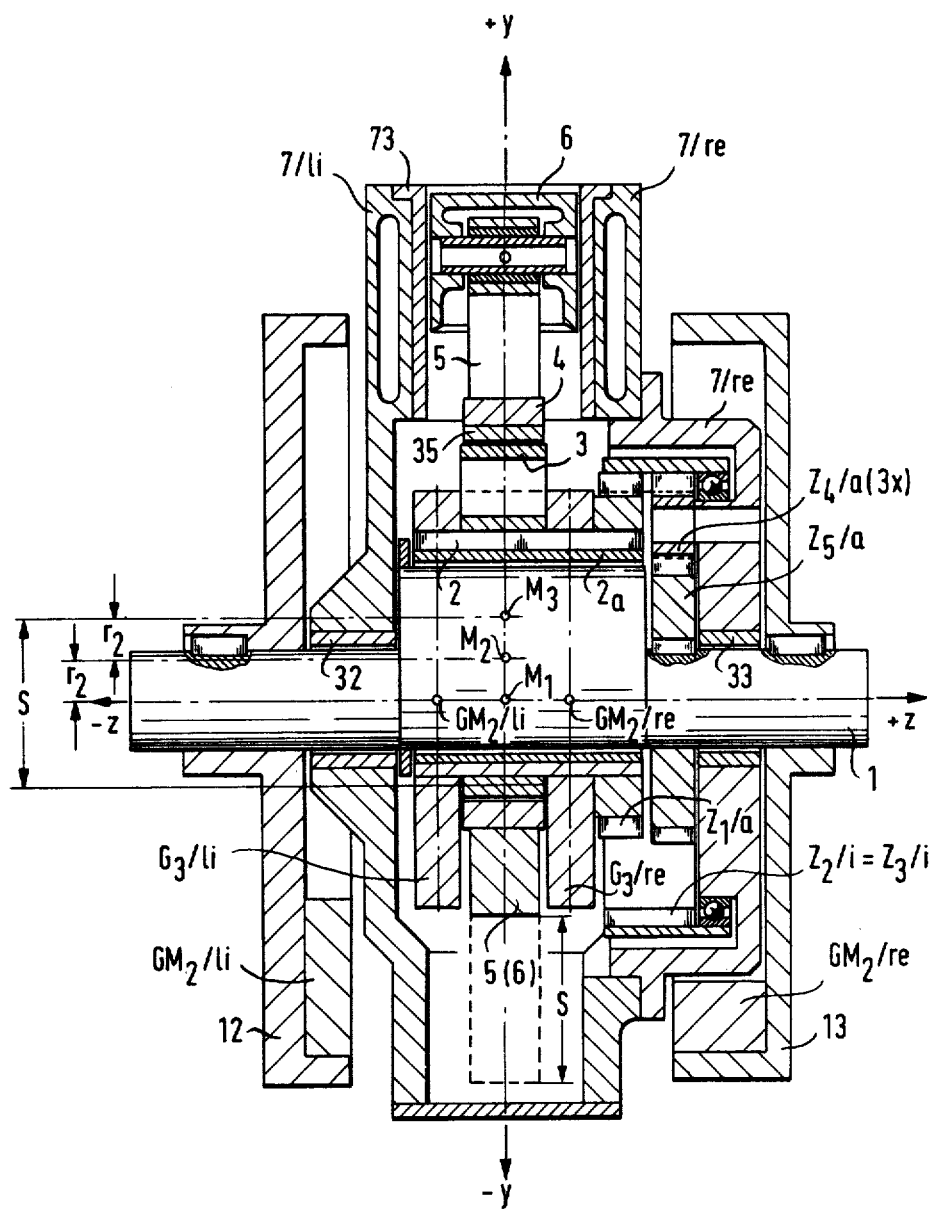
FIG. 8 shows a side view of a further embodiment of transmission arrangement in accordance with the invention.

FIG. 8 shows a further embodiment of the gear arrangement according to the invention, in which the main shaft gear wheel $Z_5/a$ meshes with transmission gear wheels $Z_4/a$, which in turn mesh with an internally-toothed gear ring with a gear wheel $Z_2/i$, $Z_3/i$, whereby a corresponding movement of the gear wheel $Z_1/a$ arranged on the hollow shaft ($2a$) is caused, so that the mass centre $M_3$ moves exactly on the y axis. By the construction according to FIG. 8, because of the rotatable support of the connecting rod 5 about the piston $6b$ and the unguided flanged arrangement of the whole of the counter-weight system 5 and 6 on the connecting rod bearing ring 4, gear-cutting inaccuracies and possible deviation of the mass centre $M_3$ from exact movement along the y axis are completely eliminated in an advantageous manner, without appreciable side forces being imposed by the piston 6 on the cylinder wall 73 as a result.

Figure 7:
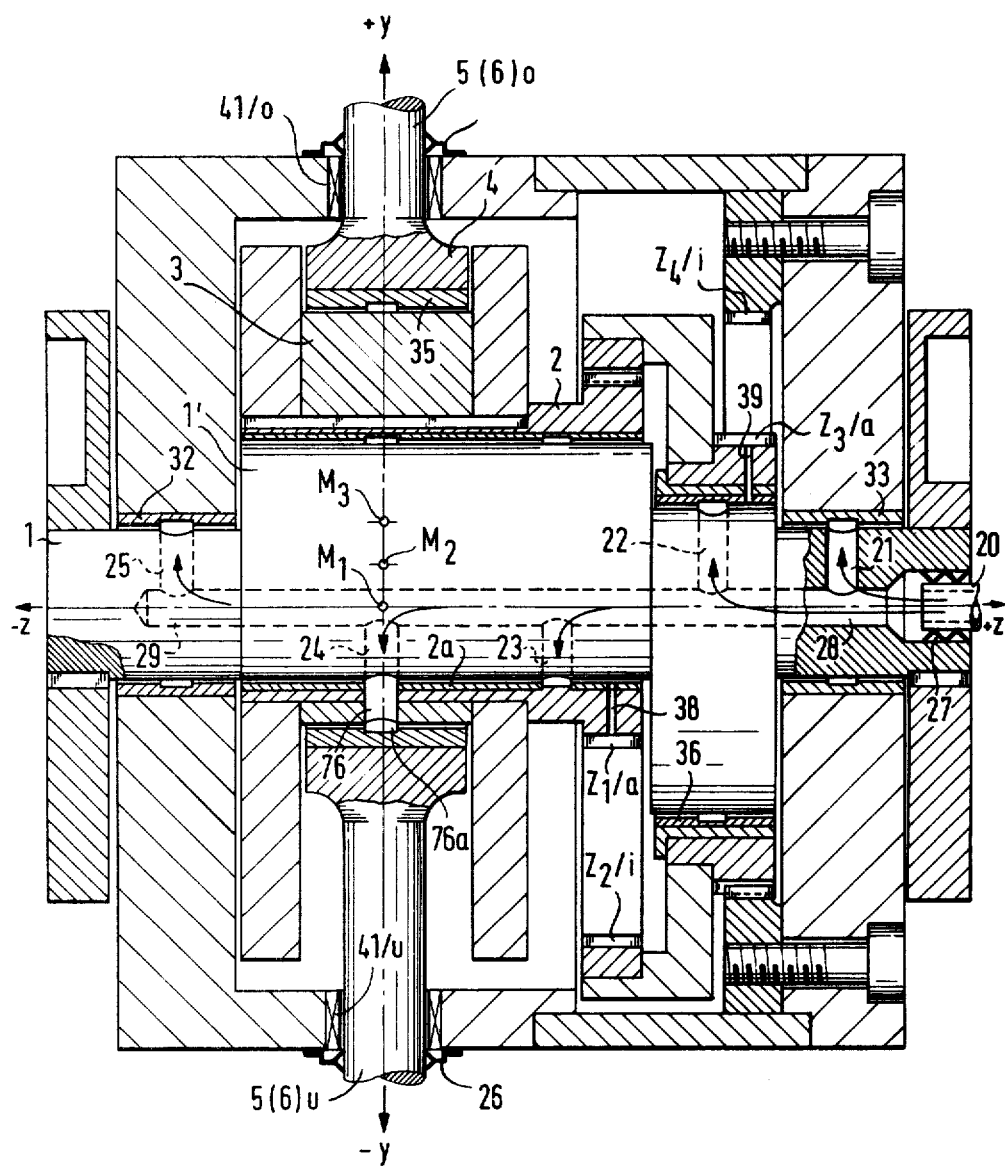
FIG. 7 shows a representation of the lubrication system of a transmission arrangement in accordance with FIG. 6.

This constructional geometry is advantageous for the construction of conventional engines and prime movers, such as combustion motors and pumps. With the gear arrangement according to the invention, all cylinder arrangements for energy converters can be made, as statically and dynamically completely balanceable and realisable mechanisms which can be constructed to dimensions of any desired size subject to strength of materials considerations, wherein a satisfactory lubrication of the bearings is also ensured, by reason of the lubrication system illustrated principally in FIG. 7.

In this, the oil supply 28 passes in the direction of the arrow through the central inlet 20 into the bore 29 of the main shaft 1, where oil losses are prevented by an internal shaft seal 27. From the central bore 29, the lubricant passes via the radial channel 21 to the right main bearing 33, via the channel 22 to the gear ring bearing 36 and from there via the channel 39 to the gear wheels $Z_3/a$ and $Z_4/i$. The channels 23 and 24 supply the supporting tube bearing $2a$ and the channel 38 supplies the gear wheels $Z_1/a$ and $Z_2/i$, whereas the channel 76 discharges into the bearing ring groove $76a$ and takes the supply to the secondary eccentric main bearing 35.

The left main bearing 32 is supplied with lubricant via the channel 25.

The usual excess oil passes to the housing outlet bearings 41. The oil seals 26 protect the housing from oil leakage.

Figure 9:
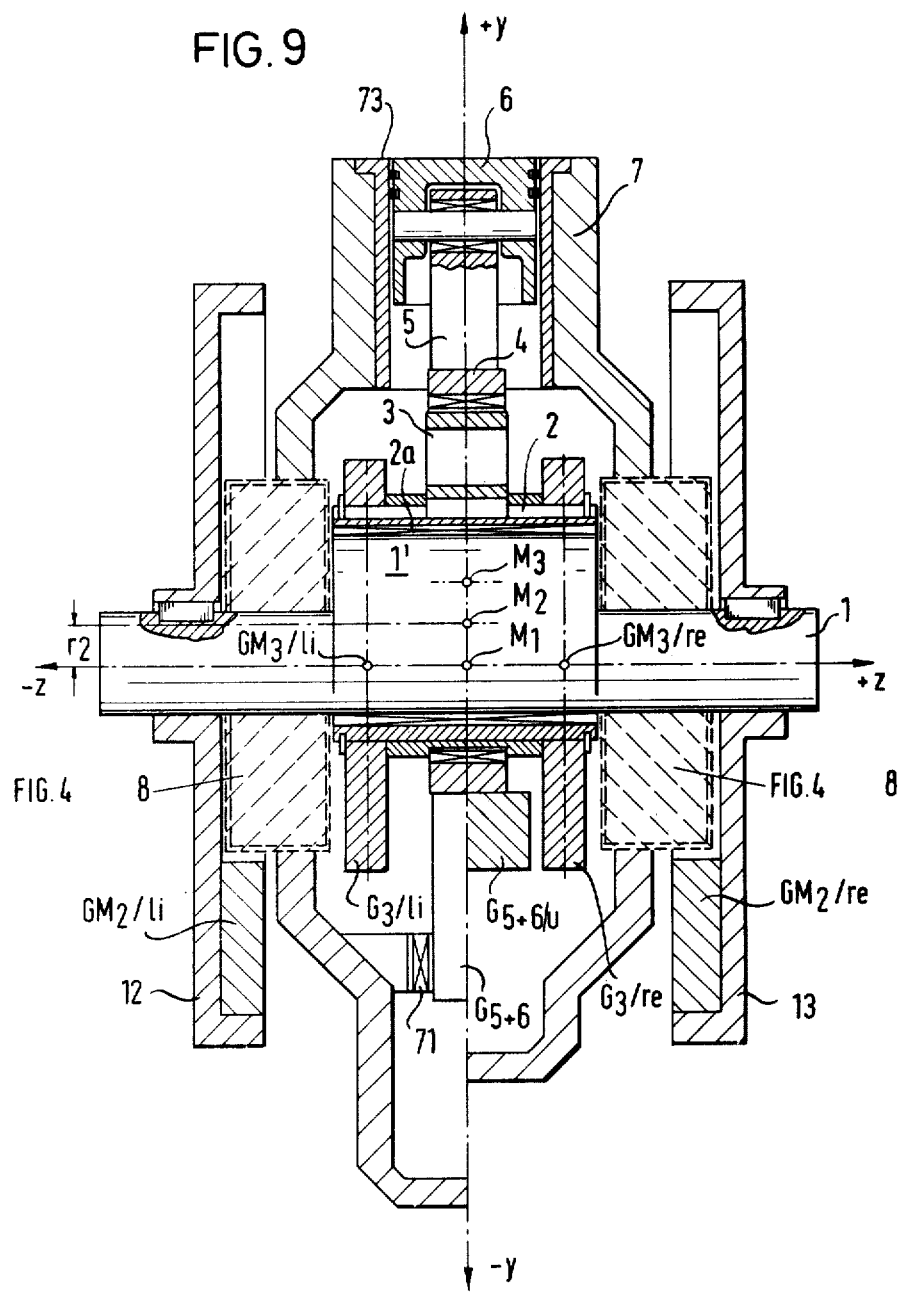
FIG. 9 shows a transmission arrangement in accordance with the invention in a single-cylinder system.

FIG. 9 shows a single-cylinder system with a transmission arrangement according to the invention with the possible adjustment systems according to FIGS. 4, 6 and 8, wherein the simulated adjustment system drive can be arranged either to the left and/or to the right. The connecting rod 5 can be pivotally arranged in the piston 6 either with a gudgeon pin or with a solid piston. The stroke corresponds always to the diameter of the pitch circle $r_1$ of the hypocycloid with the ratio of the radii of the pitch circle to the rolling circle being 2:1, wherein the rolling circle $r_2$ is kinetically equivalent to the supporting tube 2. The train of all the gear wheels of the simulation gear arrangement gives a movement along the y axis for the mass centre $M_3$ of the extent of the stroke s. The counter-weight to the piston 6 and the connecting rod 5 produce a new resultant mass centre $M_3$. Since the mass centre $M_3$ always represents an external mass of the supporting tube 2, a counter-mass $GM_{3/li}$ and $GM_{3/re}$, here represented as real masses $G_{3/li}$ and $G_{3/re}$, fixedly connected with the supporting tube 2 must be so arranged to the left and to the right of the mass centre $M_3$ that a resultant centre of gravity is produced in the mass centre $M_2$. $M_2$ is thus the mass centre of the primary eccentric $1'$, that is an external mass to the main shaft 1, which is so equilibriated without problems by addition of the counter-weights $GM_{2/li}$ and $GM_{2/re}$ that an overall centre of mass is produced at $M_1$. Thus the whole system is exactly balanced statically and dynamically.

Figure 10:
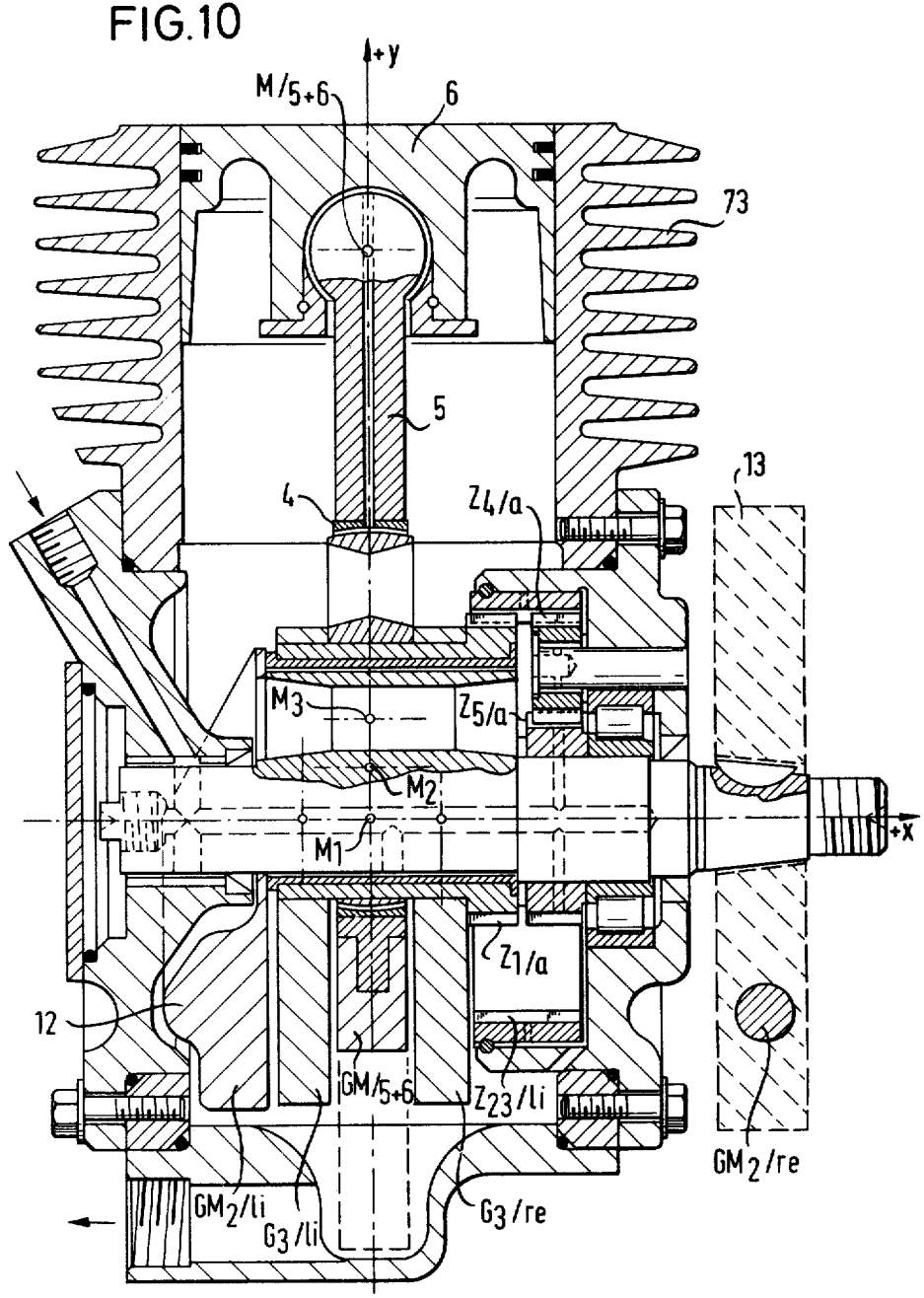
FIG. 10 shows the support of the connecting rod in the piston in an embodiment of the invention according to FIG. 9.

FIG. 10 shows the arrangement of the connecting rod 5 in the piston 6 in a single-cylinder system. The bearing ensures that the connecting rod always moves perpendicular to the supporting tube, even if by reason of manufacturing tolerances or the occurrence of wear an exactly perpendicular movement of the piston in the cylinder is no longer ensured.

Figure 12:
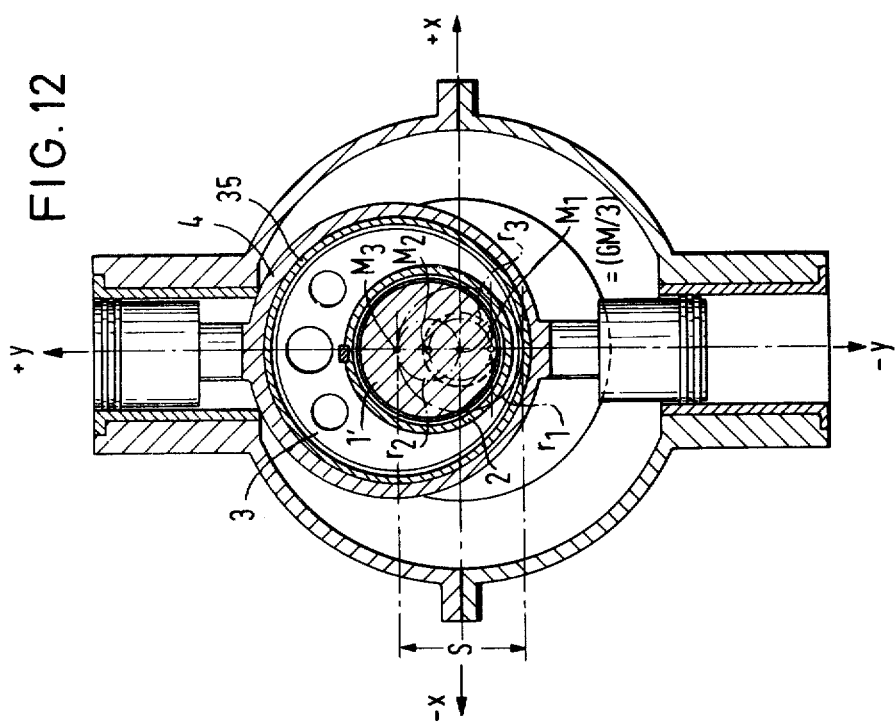
FIG. 12 shows a transmission arrangement according to the invention in a two-cylinder system, as a side view in the x-y plane.
Figure 11:
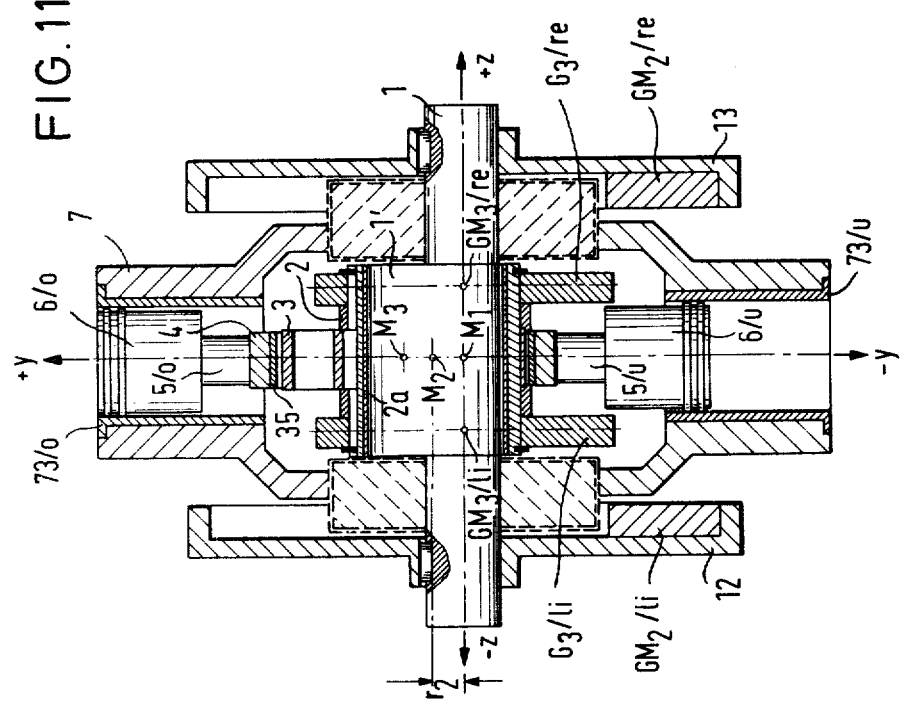
FIG. 11 shows a transmission arrangement according to the invention in a two-cylinder system, as a side view in the y-z plane.

FIGS. 11 and 12 show the arrangement of a crank-rod-type transmission arrangement for two-cylinder steam engines, two-cylinder internal combustion engines and two-cylinder gas and liquid pumps with a Boxer-arrangement of the operating cylinder 73. The upper piston 6/1 and the connecting rod 5/1 as well as the lower piston 6/2 and the connecting rod 5/2 are fixedly connected with the bearing ring 4. The pistons 6/1 and 6/2 can likewise by fixedly connected with their associated connecting rods, so that a fixed connection of piston to piston arises.

Figure 13:
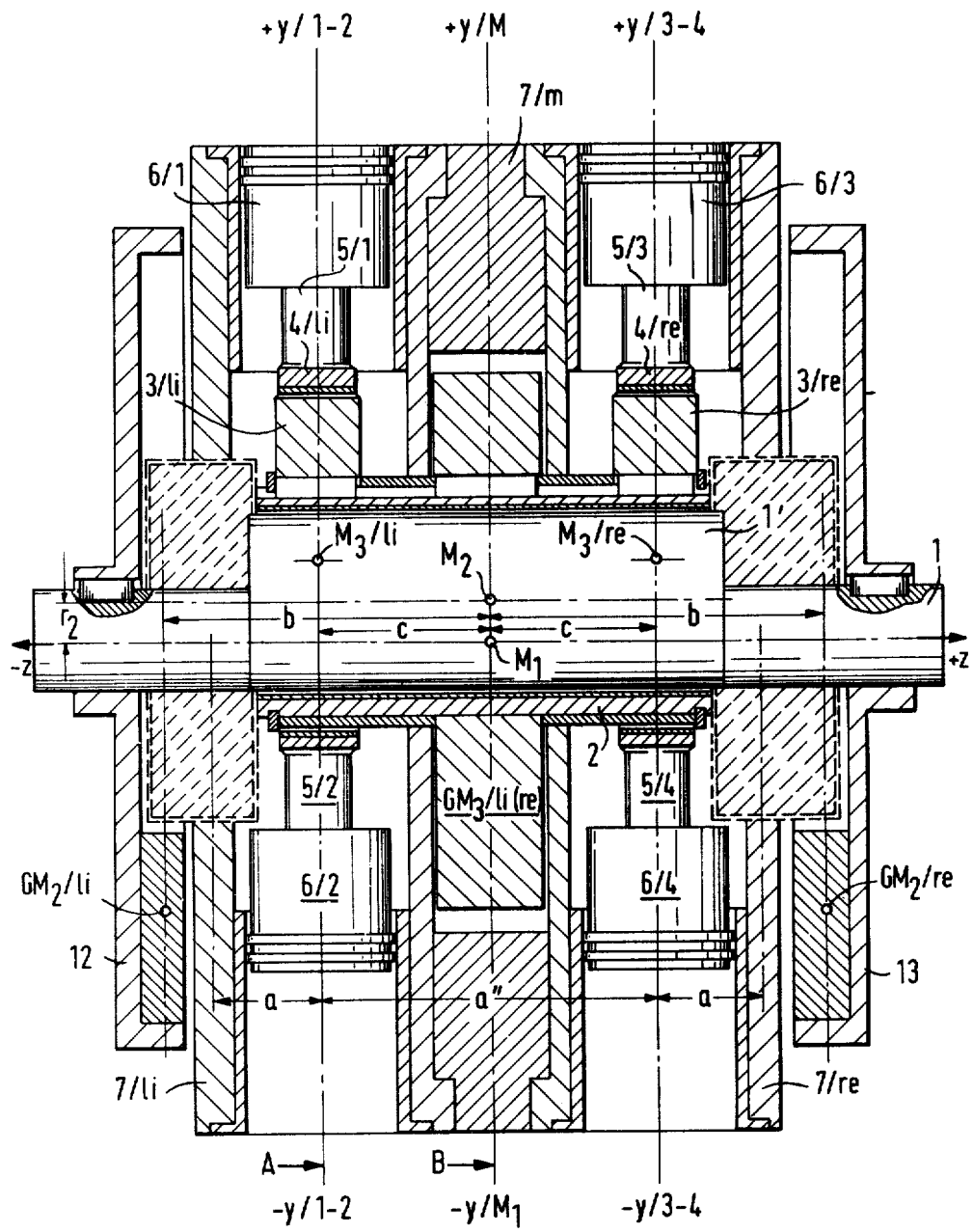
FIG. 13 shows a sectional view in the y-z plane of a transmission arrangement according to the invention in a Boxer four-cylinder system.
Figure 14:
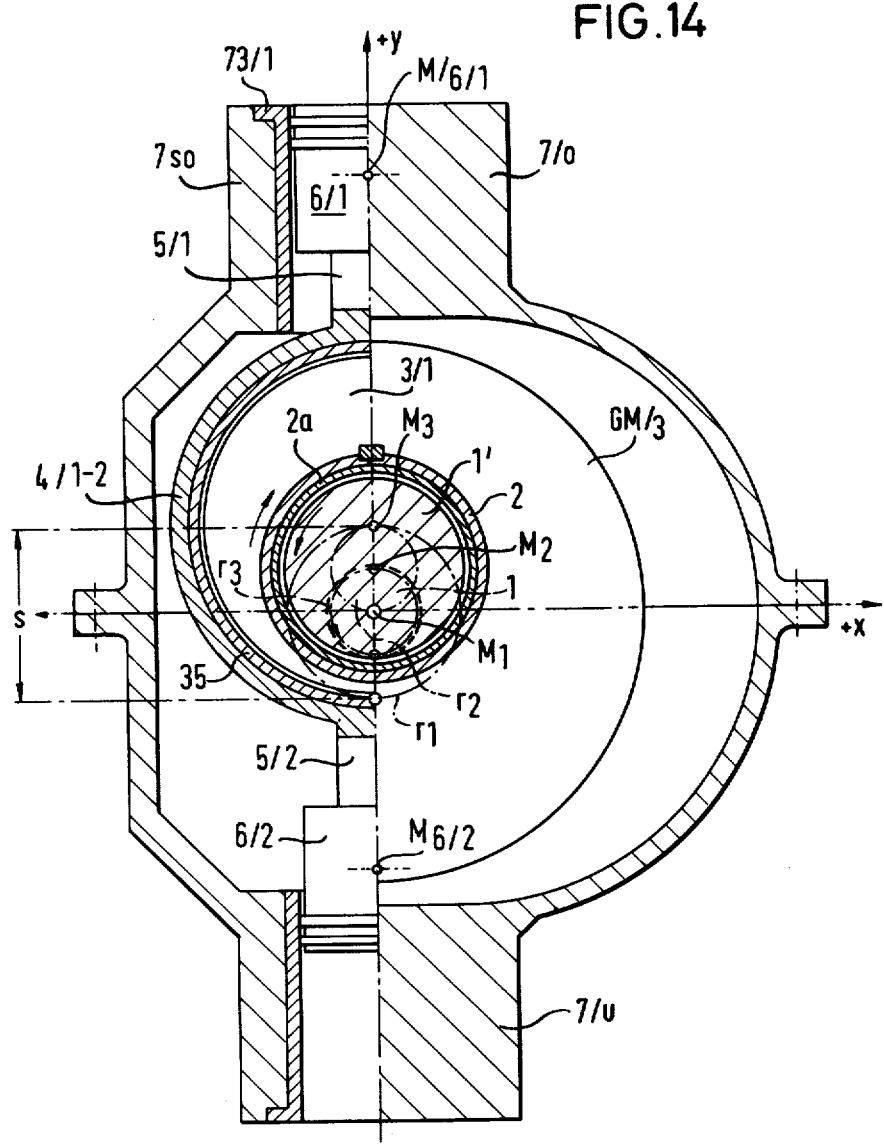
FIG. 14 shows a sectional view in the x-y plane of a transmission arrangement according to FIG. 13.

FIGS. 13 and 14 show a Boxer four-cylinder system with only one supporting tube 2 for all four cylinders. Because of the balancing arrangements, substantial advantages are given in comparison with the so-called conventional mode of construction, that is, in a four-cylinder Boxer-motor, since only one total counter-mass $GM_{3/li + re}$ is required in the centre of the system, that is the x-y plane, and two main bearings are required, since the supporting tube 2 forms a "dynamic bridge" with the primary eccentric 1'. $M_2$ is the resultant mass centre parallel to the z axis. For balancing, it is merely necessary to arrange the counter-masses $GM_{2/li}$ in the flywheel 12, and $GM_{2/re}$ in the flywheel 13, so that the overall centre of gravity is located at the mass centre $M_1$, viz. the point of intersection of the x-y-z axis system. If everything is constructed symmetrically, as is illustrated in simple form in FIG. 13, a compensation system according to FIGS. 4, 6 and 8 is sufficient to provide for exact static and dynamic balance. FIG. 14 shows a half-section in each of the planes A—A and B—B of FIG. 13, with the simplification of a fixedly-arranged double connecting rod, to which the piston itself is likewise fixedly connected.

Figure 15:
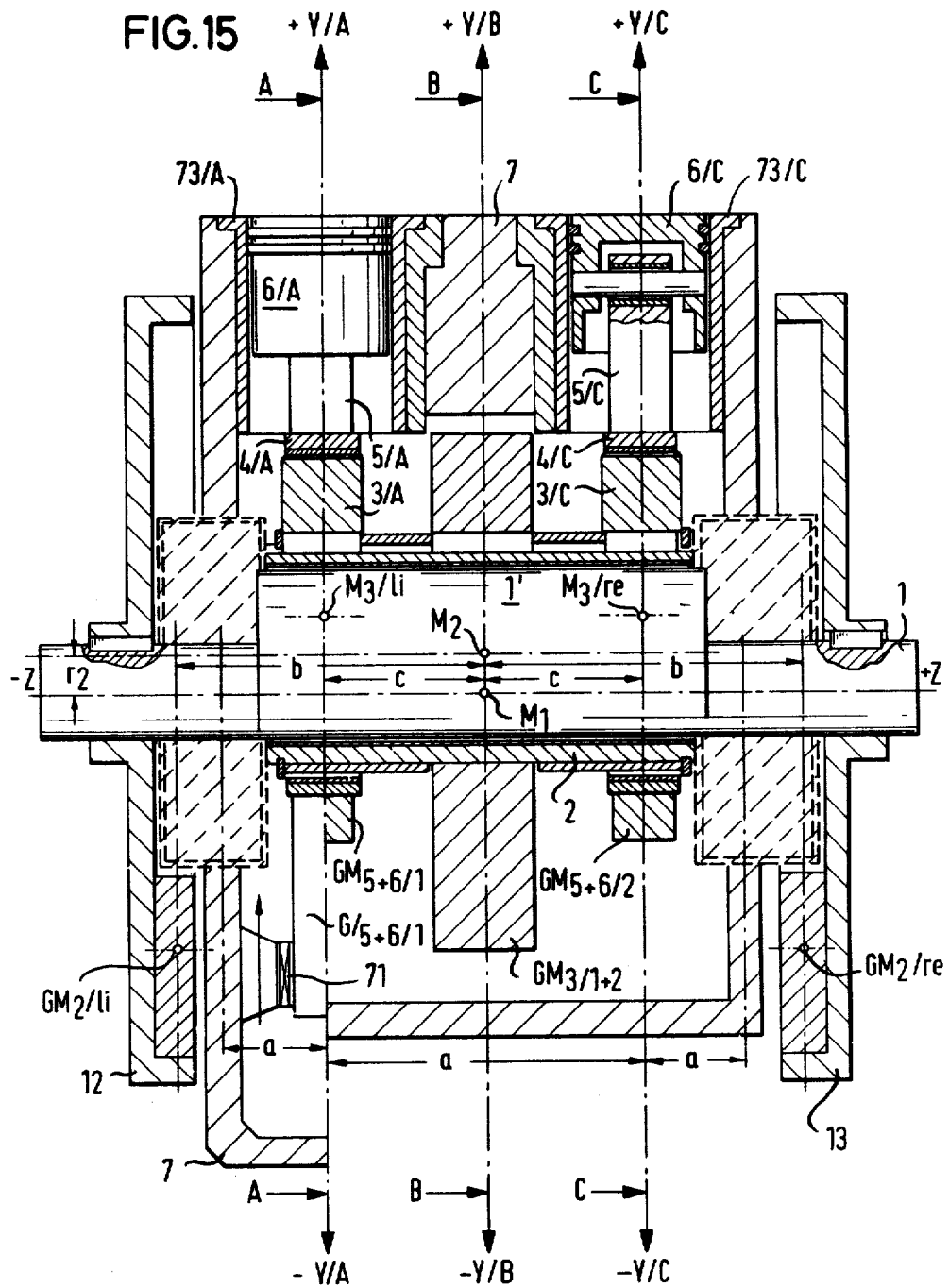
FIG. 15 shows a sectional view in the y-z plane of a transmission arrangement according to the invention in a two-cylinder twin system.
Figure 16:
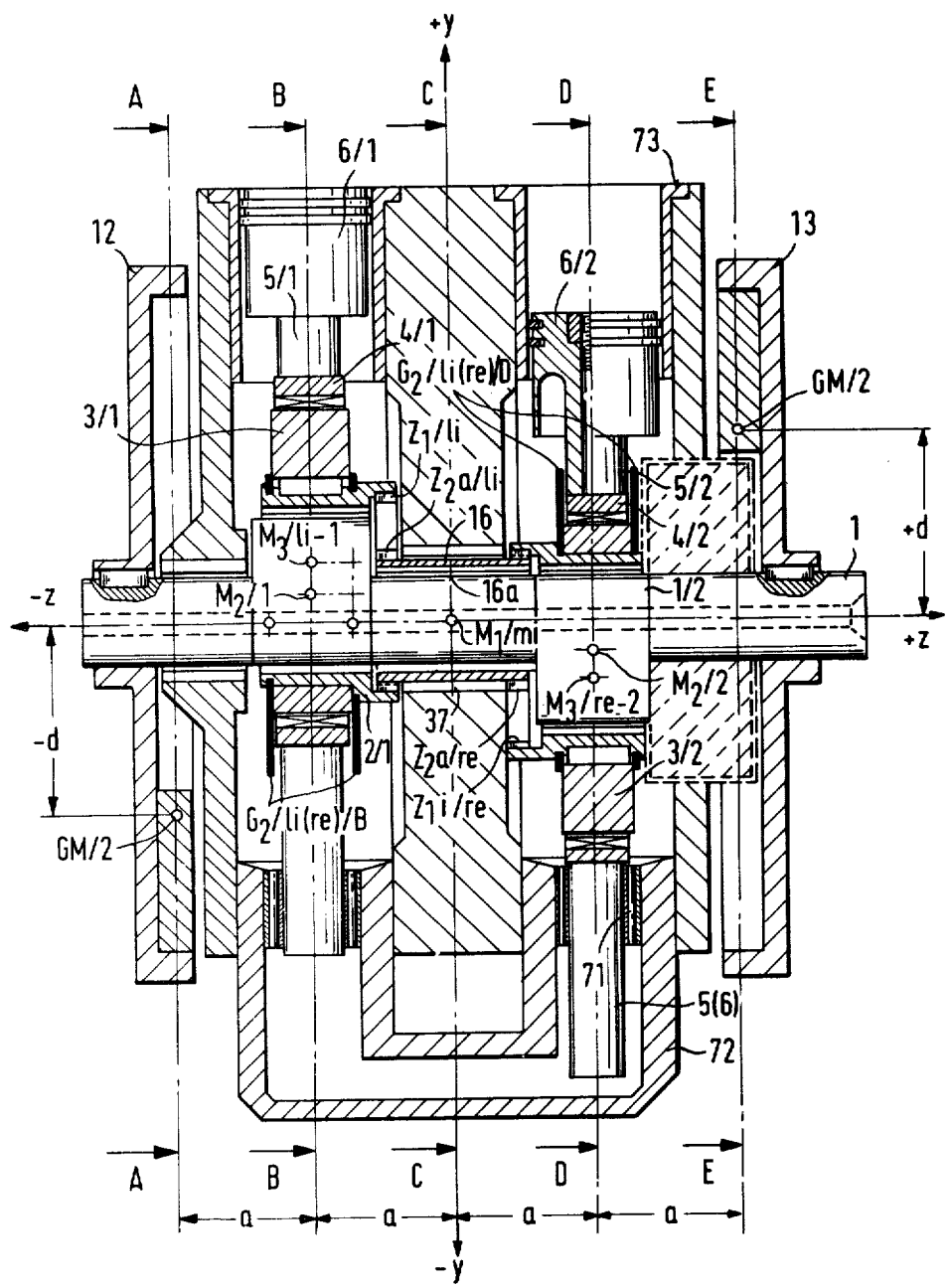
FIG. 16 shows a sectional view in the y-z plane of a two-cylinder system with guided compensating masses.

FIG. 15 shows a longitudinal section through a two-cylinder twin arrangement, where the two pistons move in parallel. It can be seen that the lower connecting rods 5/1 and 6/1 can be guided by a longitudinal bearing 71 (see FIG. 16). It is likewise possible to connect the pistons pivotally to the connecting or driving rods, whereby then the counter-mass $G5 + 6/2$ can be arranged symmetrically with respect to the bearing ring 42. The advantage of the opposed arrangement of the counterweights G5 and 6/1 and G5 and 6/2 in connection with the pivotal support of the piston with the connecting rod lies in the possibility of taking into consideration all gear wheel inaccuracies. For exact adjustment of the supporting tube 2, an adjustment system arranged at one side is sufficient. The total balancing procedure corresponds to that illustrated in FIG. 13.

Figure 17:
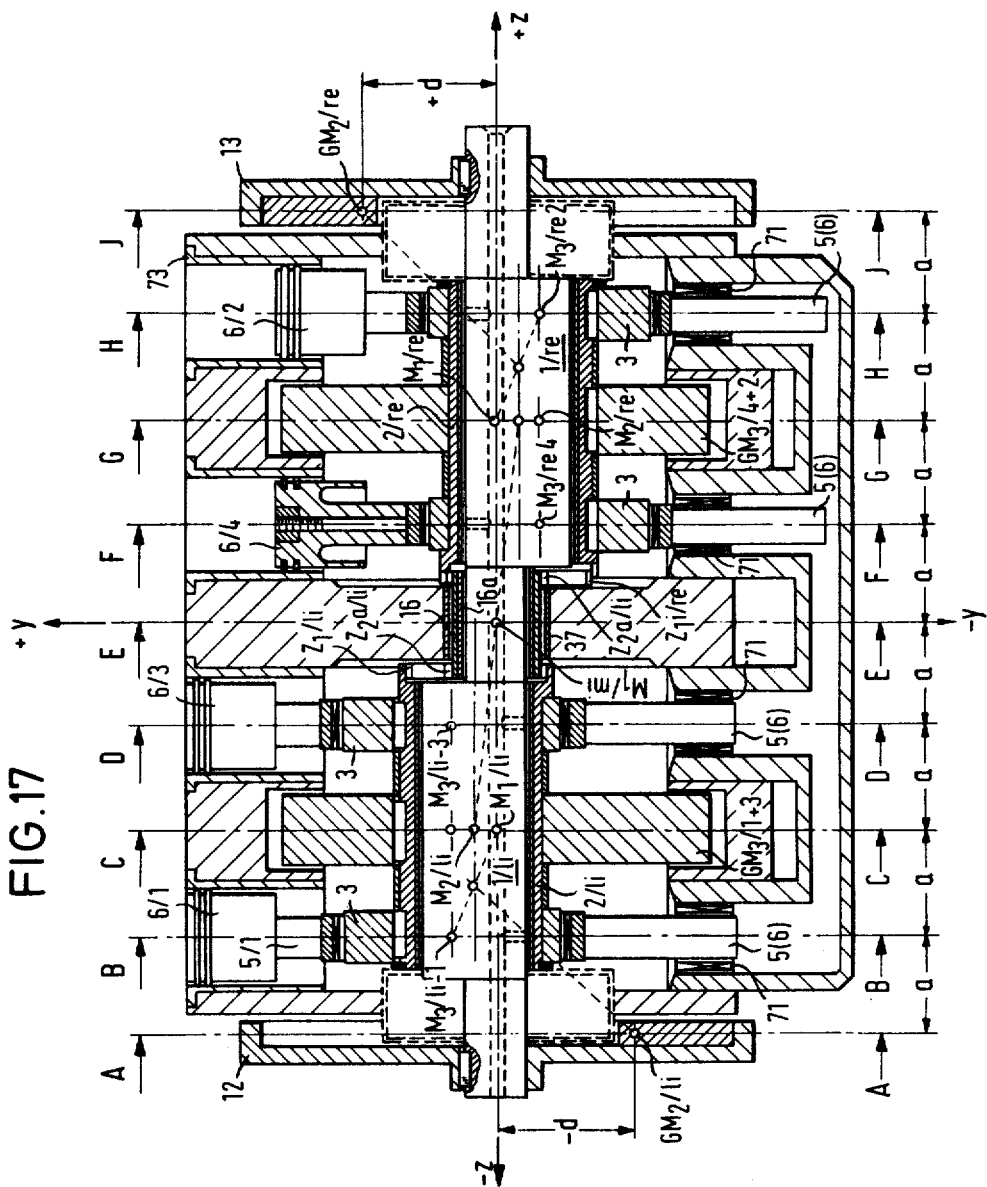
FIG. 17 shows a sectional view in the y-z plane of a transmission arrangement in a multi-cylinder in-line system.

FIG. 17 shows the classic construction of a four-cylinder in-line system with a kinetic bridge 16 with the two transmission gear wheels $Z_{2a/li}$ and $Z_{2a/re}$, which ensure proper and simultaneous counter-rotation of the two supporting tubes 2/li and 2/re. The system is suitable for heavy duty, i.e. highly-loadable, diesel or Otto-cycle internal combustion machines and also for high-loadable gas pumps or steam engines and is completely statically and dynamically balanceable.

The balancing process can be carried out as follows. All masses of the left supporting tube 2/li have their mass centre at $M_{2/li}$ and all masses of the right supporting tube at $M_{2/re}$. For balancing, the four cylinder system is divided into the sections A-C, C-E, E-G and G-J, whereby first the sections C-E and E-G are balanced, so that the two outer sections A-C and G-J remain. The left half of the A-C section is then equilibriated by means of a counter-mass $GM_{2/li}$ and the right half of the G-J section by the counter-mass $GM_{2/re}$. One of the compensation systems according to FIG. 4, 6 or 8, in connection with the kinetic bridge 16, then ensures appropriate adjustment of the supporting tubes 2/li and 2/re.

Figure 18:
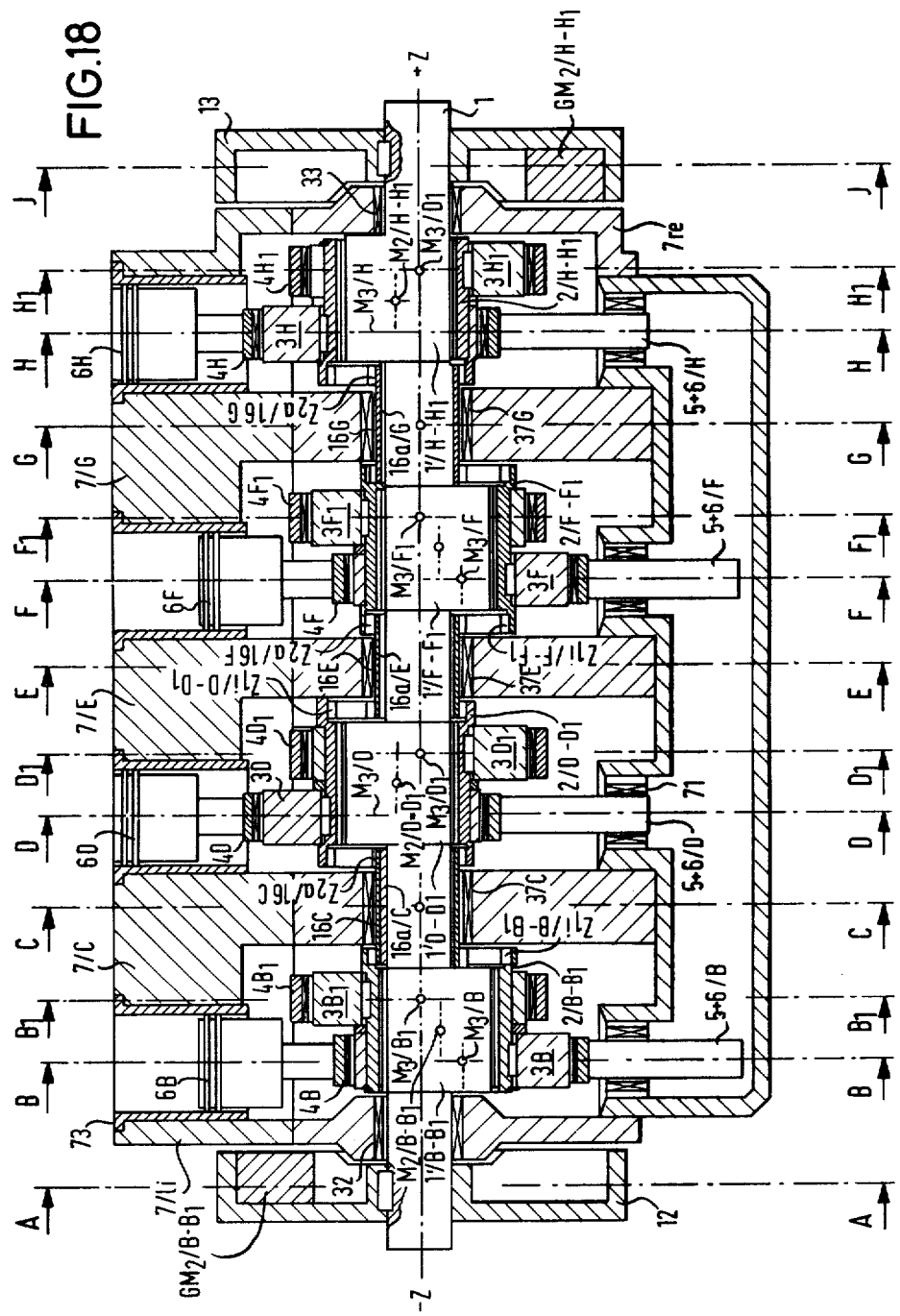
FIG. 18 shows a section view on the y-z plane of a transmission arrangement in a V-8 cylinder system.

FIG. 18 shows an example of guided counter-weights 5 and 6 in sliding bearings 71 and the possibility of arranging the pistons 6 with the connecting rods 5 fixedly on the bearing rings 4. This mode of construction is made possible by the substantially larger pitch circles of the adjustment system according to FIGS. 4, 6 and 8.

In FIG. 18, a transmission arrangement in accordance with the invention is shown in connection with a V-8 cylinder system without an auxiliary eccentric 78. In order to avoid jamming and thus malfunction of the jointless adjustment system in weakly-loaded machines, the locking angle $\beta/r_1$ must be selected so as to be greater than or smaller than 90°.

Figure 19:
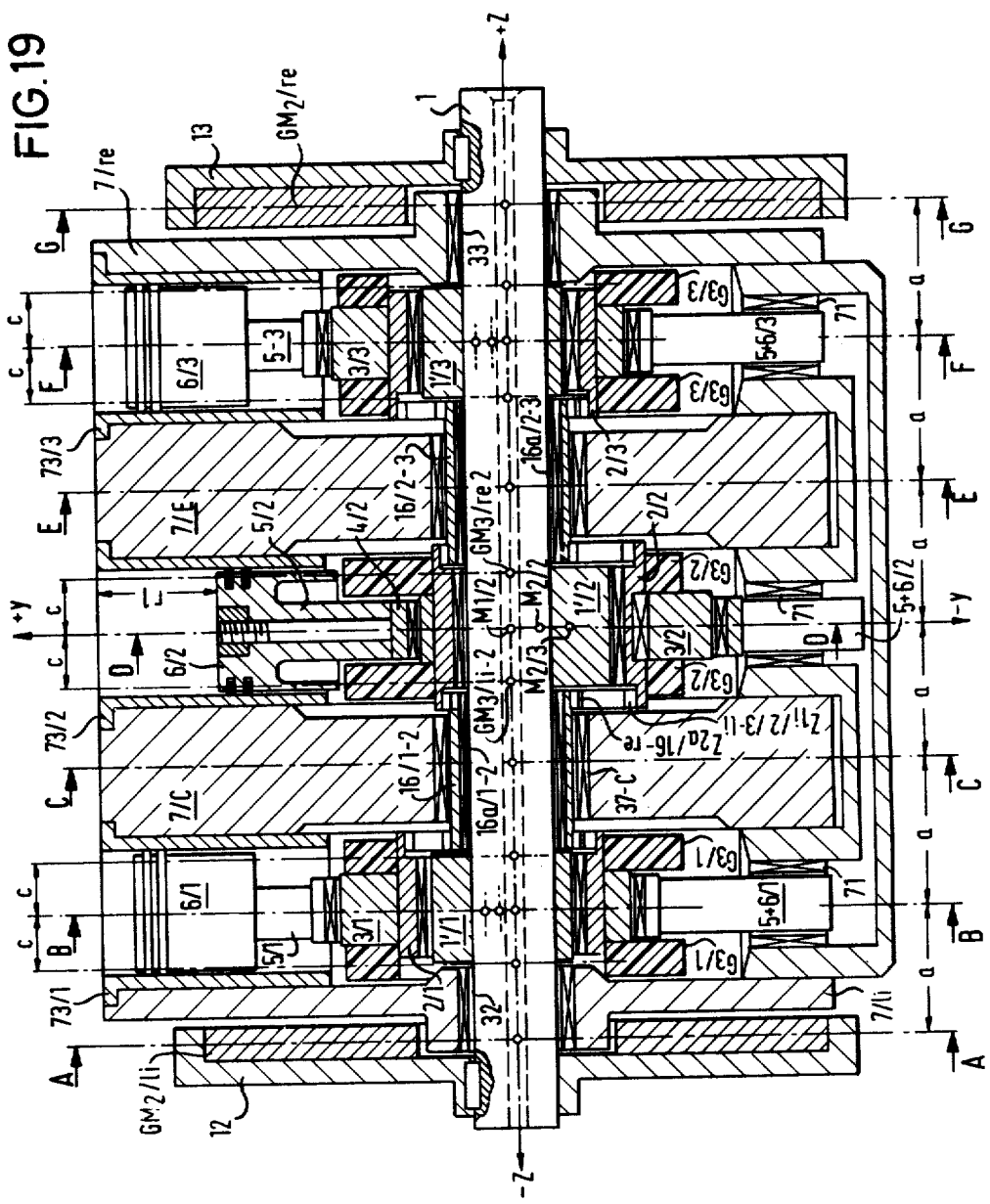
FIG. 19 shows a sectional view in the y-z plane of a transmission arrangement in a three-cylinder in-line system.

In FIG. 19 a three-cylinder in-line system with constant operative clearance distance of the separate cylinders is shown, that is to say 120° in pumps and two-strokes or 240° in four-strokes. This feature is achieved by the arrangement of the primary eccentrics 1', which are displaced by 120° with respect to one another. For balancing, all mass centres $M_3$ are first equilibriated in the planes B—B, D—D and F—F. Then the mass centre $M_2$ is balanced by means of the running counter-masses $G_{3/li}$ and $G_{3/re}$ in each of the above-mentioned planes. In order to achieve a resultant central mass $M_{1/2}$ in the median plane B—B (the x-y plane), corresponding counter-masses $GM_{2/li}$ and $GM_{2/re}$ must be arranged for each plane B—B in the side flywheels 12 (left) and 13 (right).

The correct adjustment in relation to hypocycloid kinetics can then be carried out in accordance with FIG. 4, 6 or 8, so that all constructional elements involved are loaded normally.

In the arrangement shown in FIG. 19, fixed connecting rods are used which are guided through the cylinder walls or by means of longitudinal slide bearings 71. By this arrangement and the kinetic bridges 16/1-2 and 16/2-3, a summating effect of the direct balancing adjustment of the rolling circle $r_2$ at the three points $M_{3/0}$ in the D—D plane and at $M_{3/1}$ in the B—B plane, as well as at $M_{3/3}$ in the F—F plane are therefore given. Such a construction is only lightly loadable. By the use of the balancing adjustment system in accordance with the invention according to FIG. 4, 6 or 8, a pivotal connection of the connecting rods with the pistons and a non-guided arrangement of the counter-masses in the bearing ring 4 is thus made possible.

Figure 20:
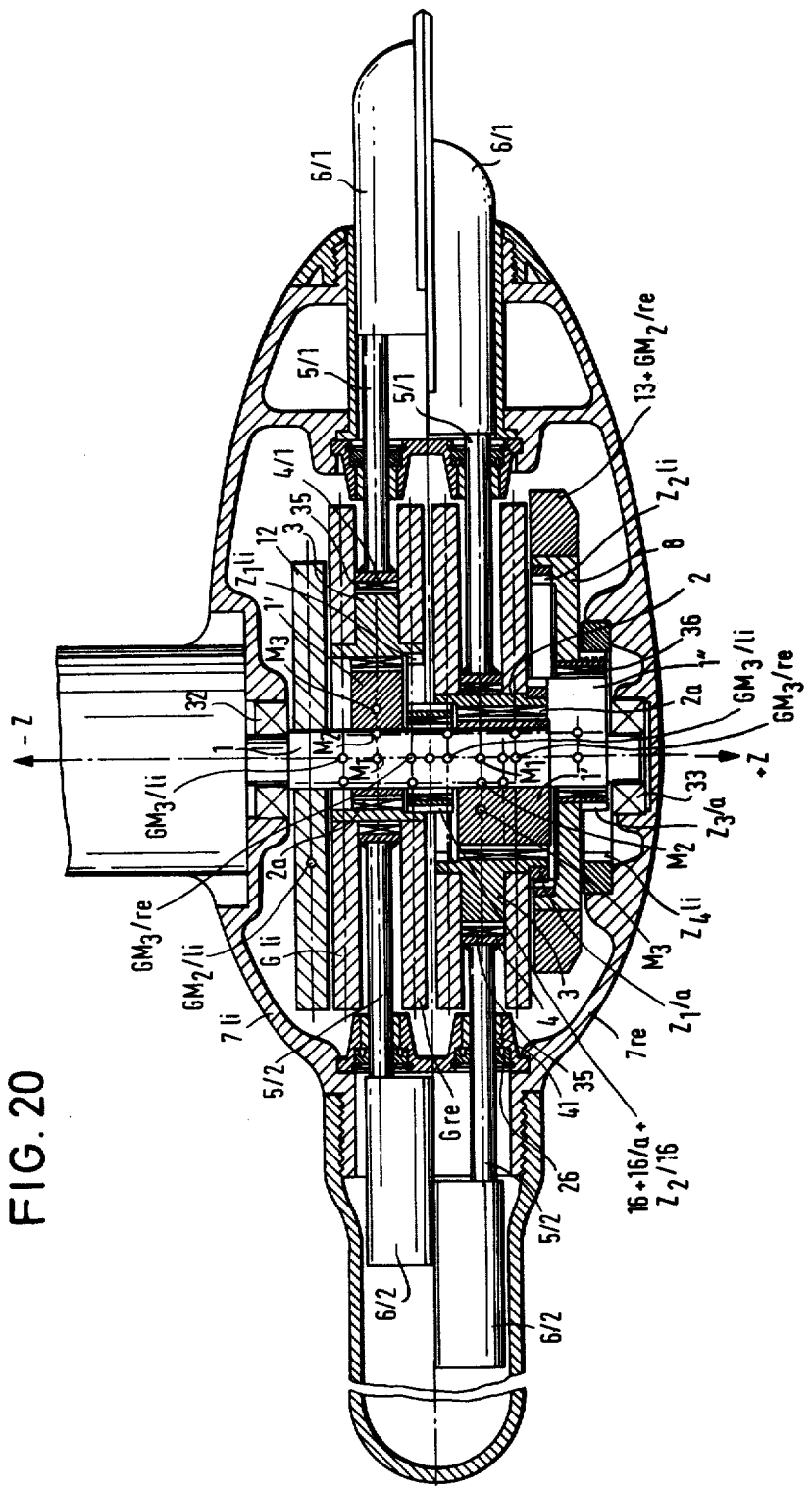
FIG. 20 shows a sectional view of a transmission arrangement according to the invention in a contra-rotating surgical operating saw.

FIG. 20 shows another embodiment of the invention, wherein the transmission arrangement is provided in the form of a surgical saw, where it is particularly important so as to achieve full static and dynamic balancing.

The saw arrangement has two counter-moving saw blades which correspond to the driven or actuating members and are so arranged that the operator is not stressed either by oscillation or by the generation of noise and the sawing process can thus be carried out rapidly and smoothly. As can be seen in FIG. 20, a main shaft 1 is provided with two primary eccentrics 1'/1 and 1'/2 which are mutually displaced by 180° and are thus located at a distance $y_1-y_2$, wherein two supporting tubes 2/1 and 2/2 are rotatably mounted on them, which are connected together by a kinetic bridge 16, whereas a compensating gear mechanism according to FIG. 6 is arranged at the right with the gear wheels $Z_1/a$, $Z_2/i$ and $Z_3/a$ and the gear wheel $Z_4/i$ in the side wall 7. The connection of this adjustment system gives an exact adjustment of the supporting tubes 2/1 and 2/2, whereby the mass centres $M_{3/1}$ and $M_{3/2}$ moves exactly along the $Y_1$ and $Y_2$ axes. Thus, contrary and sinusoidal reciprocal movement of the connecting rods 5/1/1 and 5/1/2 and of the saw blade support arrangements 6/1/1 and 6/1/2 is produced. The constructional elements 5/2/1 and 6/2/1 serve as the counter-mass about the mass centre $M_{3/1}$, whereas for the mass centre $M_{3/2}$ the constructional elements 5/2/2 and 6/2/2 operate in equilibrium. The saw-blades 6/1-S are insertable and interchangeable in the blade supports.

Figure 21:
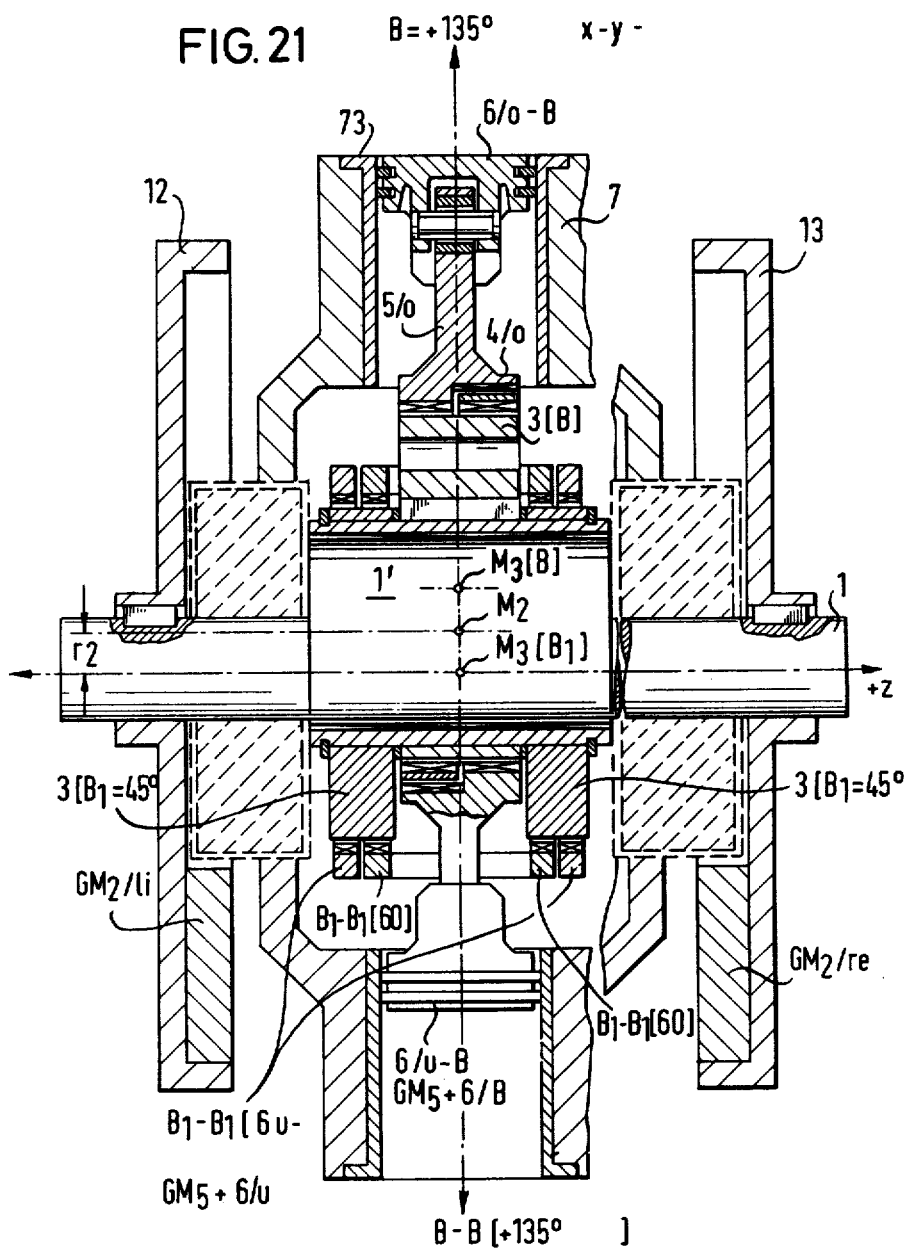
FIG. 21 shows a sectional view in the y-z plane of a transmission arrangement according to the invention embodied in a torpedo propulsion unit as a gas engine or combustion engine.
Figure 22:
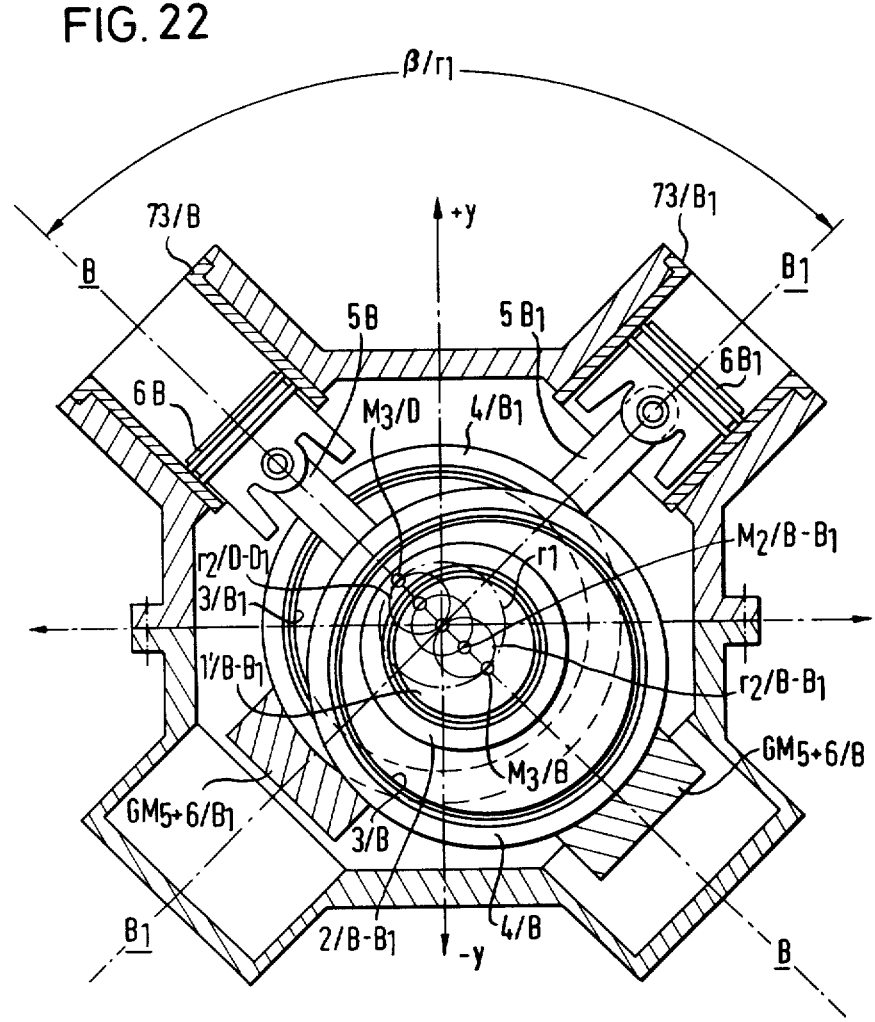
FIG. 22 shows a further sectional view in the x-y plane of the transmission arrangement according to FIG. 21.

FIGS. 21 and 22 show a torpedo propulsion unit or motor in the form of a gas engine (steam engine) or of a combustion engine, wherein a plurality of secondary eccentrics 3 can be mounted on the supporting tube 2 and the sum of their masses including their associated ring bearing 4 and the related actuating members 5 and 6 must always be centered at the secondary mass centre $M_2$ in the associated x-y plane.

For balancing, the tertiary operating masses or weights 5 and 6 rigidly or pivotally mounted upon a separate bearing ring 4/1 are counterbalanced by the corresponding counter-weights $GM_{5+6}$ or GM-K, so that a resultant tertiary mass centre M3 is produced.

This mass centre $M_3$ must counteract a counter mass $GM_3$ left and right as $GM_{3/li}$ and $GM_{3/re}$ provided on the supporting tube 2 fixedly or pivotally by means of special bearing 4, so that a secondary mass centre $M_2$ is produced.

This mass centre $M_2$ must likewise be counterbalanced on the main shaft 1 to the left and to the right by the corresponding counter-masses $GM_{2/li}$ and $GM_{2/re}$ so that the resultant overall centre of mass $M_1$ is given in the main x-y balancing plane at the point of intersection with the main axis z.

It is evident that those skilled in the art may make numerous modifications of the specific embodiments described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

We claim:

1. A mechanical transmission arrangement which comprises, in combination:
    (a) a main shaft having its axis of rotation defining the Z axis of a system of x, y and z axes disposed mutually at right angles;
    (b) at least one primary eccentric fixedly mounted upon said main shaft, the rotational axis and the load axis of the primary eccentric being spaced apart by a distance ($E_{Hy/2}$) and parallel to the z axis of the main shaft;
    (c) a supporting tube mounted on a bearing which in turn is mounted upon the primary eccentric;
    (d) at least one secondary eccentric fixedly mounted upon said supporting tube, the secondary eccentric having its rotation and load axes located parallel to the z axis of the main shaft at a maximum spacing ($2 \times E_{Hy/2}$) through the resultant mass centre ($M_3$); and
    (e) a ring bearing rotatably mounted on the secondary eccentric and with its rotation axis through the centre of mass ($M_3$); wherein said ring bearing is drivingly coupled to one of: (a) a connecting rod and an actuating member associated therewith and (b) a counterweight whereby the resultant overall centre of mass lies in the resultant mass centre ($M_3$) and the mass centre ($M_3$) is drivingly associated with counter-weights carried by the supporting tube respectively to the left of and to the right of the main (x-y) balancing plane of the transmission arrangement, and further, a secondary resultant mass centre ($M_2$) is formed which, in operation, rotates with the main shaft on a circle or radius ($E_{Hy/2}$) around a mass centre ($M_1$) which is opposed by primary balance masses ($GM_{2/left}$ and $GM_{2/right}$) drivingly connected with the main shaft, so that the resultant mass centre ($M_1$) is produced on the z axis of the main shaft and so that the transmission arrangement kinetically simulates a hypocycloid gear by means of an effectively-loadable adjustment gear to cause the mass centre ($M_3$) to move exactly on the y axis whilst the mass centres ($GM_{2/left}$ and $GM_{2/right}$) rotate about the z axis, wherein the adjustment gear comprises the combination of a first internally-toothed gear wheel mounted on the supporting tube, a first externally-toothed gear wheel fixedly mounted on a bearing tube and meshing with the first internally-toothed gear wheel, a first bearing carried by the main shaft and a second bearing located in an intermediate wall of the housing of the transmission arrangement supporting said bearing tube, a second externally-toothed gear wheel arranged on the bearing tube, a plurality of second externally-toothed gear wheels mounted in the transmission housing, each meshing both with the second externally-toothed gear wheel and with a second internally-toothed gear wheel arranged on the main shaft, said second externally-toothed gear wheels being located with their respective points of rotation radially arranged at mutual spacing about the main shaft and second internally-toothed gear wheel having its point of rotation located on the axis of the main shaft.

2. A mechanical transmission arrangement which comprises, in combination:
    (a) a main shaft having its axis of rotation defining the Z axis of a system of x, y and z axes disposed mutually at right angles;
    (b) at least one primary eccentric fixedly mounted upon said main shaft, the rotational axis and the load axis of the primary eccentric being spaced apart by a distance ($E_{Hy/2}$) and parallel to the z axis of the main shaft;
    (c) a supporting tube mounted on a bearing which in turn is mounted upon the primary eccentric;

(d) at least one secondary eccentric fixedly mounted upon said supporting tube, the secondary eccentric having its rotation and load axes located parallel to the z axis of the main shaft at a maximum spacing $(2 \times E_{Hy/2})$ through the resultant mass centre ($M_3$); and (e) a ring bearing rotatably mounted on the secondary eccentric and with its rotation axis through the centre of mass ($M_3$); wherein said ring bearing is drivingly coupled to one of: (a) a connecting rod and an actuating member associated therewith and (b) a counterweight whereby the resultant overall centre of mass lies in the resultant mass centre ($M_3$) and the mass centre ($M_3$) is drivingly associated with counterweights carried by the supporting tube respectively to the left of and to the right of the main (x-y) balancing plane of the transmission arrangement, and further, a secondary resultant mass centre ($M_2$) is formed which, in operation, rotates with the main shaft on a circle of radius ($E_{Hy/2}$) around a mass centre ($M_1$) which is opposed by primary balance masses ($GM_{2/left}$ and $GM_{2/right}$) drivingly connected with the main shaft, so that the resultant mass centre ($M_1$) is produced on the z axis of the main shaft and so that the transmission arrangement kinetically simulates a hypocycloid gear by means of an effectively-loadable adjustment gear to cause the mass centre ($M_3$) to move exactly on the y axis whilst the mass centres ($GM_{2/left}$ and $GM_{2/right}$) rotate about the z axis, wherein the adjustment gear comprises: a first externally-toothed gear wheel mounted on the supporting tube, a ring gear mounted on a second eccentric, a first internally-toothed gear wheel arranged in said ring gear and meshed with said first externally-toothed gear wheel, a second externally-toothed gear wheel carried by said ring gear and meshed with a second fixedly-arranged internally-toothed gear wheel, whereby the axis of rotation of the ring gear runs at a spacing ($E_x$) parallel to the axis of the main shaft.

3. A mechanical transmission arrangement which comprises, in combination:
(a) a main shaft having its axis of rotation defining the Z axis of a system of x, y and z axes disposed mutually at right angles;
(b) at least one primary eccentric fixedly mounted upon said main shaft, the rotational axis and the load axis of the primary eccentric being spaced apart by a distance ($E_{Hy/2}$) and parallel to the z axis of the main shaft;
(c) a supporting tube mounted on a bearing which in turn is mounted upon the primary eccentric;
(d) at least one secondary eccentric fixedly mounted upon said supporting tube, the second eccentric having its rotation and load axes located parallel to the z axis of the main shaft at a maximum spacing $(2 \times E_{Hy/2})$ through the resultant mass centre ($M_3$); and
(e) a ring bearing rotatably mounted on the secondary eccentric and with its rotation axis through the centre of mass ($M_3$); wherein said ring bearing its drivingly coupled to one of: (a) a connecting rod and an actuating member associated therewith and (b) a counterweight whereby the resultant overall centre of mass lies in the resultant mass centre ($M_3$) and the mass centre ($M_3$) is drivingly associated with counterweights carried by the supporting tube respectively to the left of and to the right of the main (x-y) balancing plane of the transmission arrangement, and further, a secondary resultant mass centre ($M_2$) is formed which, in operation, rotates with the main shaft on a circle of radius ($E_{Hy/2}$) around a mass centre ($M_1$) which is opposed by primary balance masses ($GM_{2/left}$ and $GM_{2/right}$) drivingly connected with the main shaft, so that the resultant mass centre ($M_1$) is produced of the z axis of the main shaft and so that the transmission arrangement kinetically simulates a hypocycloid gear by means of an effectively-loadable adjustment gear to cause the mass centre ($M_3$) to move exactly on the y axis whilst the mass centres ($GM_{2/left}$ and $GM_{2/right}$) rotate about the z axis, wherein the adjustment gear comprises: a first externally-toothed gear wheel mounted on the supporting tube, a first internally-toothed gear wheel meshed with said first externally-toothed gear wheel and also with at least one second externally-toothed gear wheel radially spaced from the axis of the main shaft, said second externally-toothed gear wheel being mounted for rotation in a wall of the housing of the tranmission arrangement, and a third externally-toothed gear wheel arranged on the main shaft and meshed with said at least one second externally-toothed gear wheels.

4. A transmission arrangement according to claims 1, 2 or 3, wherein a lubrication bore is provided in the main shaft, a plurality of lubricant supply side channels extend from such bore one to each of the bearings for supplying lubricant to said bearings and at least one lubricant supply channel extend from a bearing to the gear wheel associated therewith.

5. A transmission arrangement according to claims 1, 2 or 3, wherein tertiary counter-masses disposed respectively to the right of and/or to the left of the x-y plane are arranged relative to the load, such load comprising masses which are guided in bearings mounted on a bearing ring.

6. A transmission arrangement according to claims 1, 2 or 3, wherein tertiary counter-weights for the unguided load are disposed respectively to the right of and to the left of the x-y plane of the transmission arrangement.

7. A transmission arrangement according to claim 5, wherein the load is formed as a piston-connecting rod arrangement where the connecting rod is hingedly connected with the piston.

8. A transmission arrangement according to claim 7, wherein the load is contructed as a piston-connecting rod arrangement which is connected with a further lower piston-connecting rod arrangement fixed to the ring bearing.

9. A transmission arrangement according to claim 7, wherein the adjustment gear is arranged to one side of said piston-connecting rod arrangement and wherein a common counter-mass is provided for said piston-connecting rod arrangement.

10. A transmission arrangement according to claim 9, wherein the piston-connecting rod arrangement is arranged in one of a four-cylinder Boxer-type combustion engine and a four cylinder pump.

11. A transmission arrangement according to claim 9, wherein the piston-connecting rod arrangement is arranged in one of a two-cylinder twin combustion engine and a two-cylinder pump.

12. A transmission arrangement according to claim 9, wherein the piston-connecting rod arrangement is arranged in one of a multi-cylinder in-line combustion engine and a two-cylinder in-line pump, wherein the compensating masses for each piston are separately guided.

13. A transmission arrangement according to claim 12, wherein the primary and secondary eccentrics are arranged on the main shaft mutually displaced by 180°.

14. A transmission arrangement according to claim 12, wherein the primary and secondary eccentrics are arranged on the main shaft mutually displaced by 120°, kinetic bridges are provided between the separate piston-connecting rod arrangements and longitudinal bearings are provided for guiding the piston balance masses.

15. A transmission according to claim 12, wherein the piston-connecting rod arrangement is arranged in one of a four-cylinder V-90° combustion engine and a four-cylinder V-90° pump.

16. A transmission arrangement according to claim 12, wherein the piston-connecting rod arrangement is arranged in one of an eight-cylinder V-90° combustion engine and an eight-cylinder V-90° pump.

17. A transmission arrangement according to claim 16, wherein the primary eccentrics are displaced by 180°.

18. A transmission arrangement according to claims 1, 2 or 3, wherein the load comprises a reciprocal saw-blade arrangement.

19. A transmission arrangement according to claims 1, 2 or 3, wherein the piston-connecting rod arrangement is provided in one of a gas engine and a combustion engine, a plurality of secondary eccentrics are arranged on the supporting tube having the sum of their masses including their ring bearing and associated actuating members arranged so as to produce a secondary mass centre ($M_2$) in the appropriate x-y plane.

* * * * *